United States Patent
Raffin et al.

(10) Patent No.: US 8,662,261 B2
(45) Date of Patent: Mar. 4, 2014

(54) BRAKE PAD HOLDER AND BRAKE PAD OF A DISC BRAKE

(75) Inventors: Christian Raffin, Grasbrunn (DE);
Markus Gruber, Ebersberg (DE);
Wlodzimierz Macke, Olching (DE);
Thomas Lehner, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 312 days.

(21) Appl. No.: 12/750,878

(22) Filed: Mar. 31, 2010

(65) Prior Publication Data
US 2010/0252370 A1    Oct. 7, 2010

Related U.S. Application Data

(63) Continuation of application No. PCT/EP2008/007762, filed on Sep. 17, 2008.

(30) Foreign Application Priority Data

Oct. 1, 2007 (DE) .......................... 10 2007 046 945

(51) Int. Cl.
*F16D 55/00* (2006.01)
(52) U.S. Cl.
USPC ................................. 188/73.32; 188/1.11 W
(58) Field of Classification Search
USPC ............ 188/1.11 W, 71.1, 73.1, 73.31, 73.32, 188/73.37, 73.38, 73.43, 73.47
See application file for complete search history.

(56) References Cited

U.S. PATENT DOCUMENTS

| 3,416,634 | A | * | 12/1968 | Swift | 188/73.44 |
| 4,498,564 | A | * | 2/1985 | Tamura | 188/73.32 |
| 4,677,420 | A | * | 6/1987 | Topic et al. | 340/454 |
| 5,103,939 | A | * | 4/1992 | Schroeter | 188/72.4 |
| 5,875,873 | A | * | 3/1999 | Kay et al. | 188/73.38 |
| 6,910,555 | B2 | * | 6/2005 | Ciotti et al. | 188/73.47 |
| 7,316,301 | B2 | * | 1/2008 | Roberts | 188/250 B |
| 7,438,160 | B2 | * | 10/2008 | Maehara | 188/73.31 |

(Continued)

FOREIGN PATENT DOCUMENTS

| DE | 40 20 287 A1 | 1/1992 |
| DE | 103 28 194 B3 | 12/2004 |

(Continued)

OTHER PUBLICATIONS

Chinese Office Action dated Oct. 26, 2011 including English-language translation (Ten (10) pages).

(Continued)

*Primary Examiner* — Thomas Irvin
(74) *Attorney, Agent, or Firm* — Crowell & Moring LLP

(57) ABSTRACT

A brake pad holder of a disc brake, in particular for a commercial vehicle is provided, wherein brake pads assigned to both sides of a brake disc are held by a respective pad-holding spring in a spring-loaded manner in a pad shaft of a positionally fixed brake anchor plate or of a brake caliper. A pad-holding clip, which extends in the axial direction of the brake disc and is fastened to the brake caliper, is supported on the brake pads. The brake pad holder is designed such that the pad-holding clip has at least one limb which extends approximately radially with respect to the brake disc and enters into a recess of at least one brake pad.

12 Claims, 2 Drawing Sheets

(56) References Cited

U.S. PATENT DOCUMENTS

| | | | |
|---|---|---|---|
| 7,438,161 B2 * | 10/2008 | Burgoon et al. | 188/73.32 |
| 7,469,775 B2 * | 12/2008 | Linke et al. | 188/73.38 |
| 2005/0067232 A1 * | 3/2005 | Roberts | 188/73.1 |
| 2006/0151262 A1 * | 7/2006 | Baumgartner et al. | 188/72.9 |
| 2006/0213730 A1 * | 9/2006 | Burgoon et al. | 188/73.1 |
| 2006/0260885 A1 * | 11/2006 | Maehara | 188/71.1 |
| 2008/0110707 A1 * | 5/2008 | Kromer | 188/218 A |
| 2008/0257657 A1 * | 10/2008 | Siebke | 188/1.11 L |
| 2008/0264739 A1 * | 10/2008 | Pritz et al. | 188/73.31 |
| 2009/0236188 A1 * | 9/2009 | Raffin et al. | 188/73.31 |

FOREIGN PATENT DOCUMENTS

| | | |
|---|---|---|
| DE | 10 2006 051 965 A1 | 5/2007 |
| DE | 10 2005 060 551 A1 | 6/2007 |
| DE | 20 2004 021 249 U1 | 7/2007 |
| DE | 10 2005 052 436 B3 | 8/2007 |
| EP | 1 473 481 B1 | 11/2004 |
| EP | 1 491 789 B1 | 12/2004 |
| WO | WO 2007/051614 A1 | 5/2007 |

OTHER PUBLICATIONS

German Office Action dated Jul. 22, 2008 with English translation (six (6) pages).

International Search Report dated Dec. 23, 2008 with English translation (four (4) pages).

* cited by examiner

BRAKE PAD HOLDER AND BRAKE PAD OF A DISC BRAKE

CROSS-REFERENCE TO RELATED APPLICATIONS

This application is a continuation of PCT International Application No. PCT/EP2008/007762, filed Sep. 17, 2008, which claims priority under 35 U.S.C. §119 from German Patent Application No. DE 10 2007 046 945.6, filed Oct. 1, 2007, the entire disclosures of which are herein expressly incorporated by reference.

BACKGROUND AND SUMMARY OF THE INVENTION

The invention relates to a brake pad holder of a disc brake, in particular for a commercial vehicle.

It is known from German patent document DE 40 20 287 A1 to provide each of the two brake pads used in a disc brake, for positional securing thereof, with a respective pad-holding spring. The pad holding spring is fastened to the brake pad in the upper edge region oriented towards an assembly opening of the brake caliper in such a manner that it is pressed under preload into the pad shaft of a positionally fixed brake anchor plate (carrier) or of a brake caliper by a pad-holding clip. The pad holding clip extends transversely to the brake pads, that is, in the axial direction of the brake disc. In this case, the pad-holding clip is fastened in two opposite regions of the caliper bounding the assembly opening.

The known pad-holding clip is configured as a sheet metal part and has a substantially rectangular cross section, so that the pad-holding clip bears against the pad-holding spring with its flat underside surface.

In operation, relative movement may occur between the pad-holding clip and the pad-holding spring transversely to the longitudinal extent of the pad-holding clip, resulting in additional stresses on the parts concerned, for example abrasion of surface coatings which ultimately influence corrosion behavior.

In addition to these functional disadvantages, the known brake pad holder, because of its configuration, does not offer any assurance that brake pads which are unsuitable for the brake model concerned are not installed.

Thus, brake pads, the installed height of which is less than that of the appropriate brake pads, can be readily used, so that the brake pads and their pad-holding springs are then not contacted and held under preload by the pad-holding clip. The desired effect of the use of the pad-holding clip, namely tolerance-compensation and reduction or prevention of clatter noises that can occur during operation of the vehicle, is not produced in this case. In principle, any brake pad which does not exceed a minimum height can be installed.

It is the object of the invention to develop a brake pad holder and a brake pad system such that its operating safety is improved and its service life is increased.

This object is achieved by a brake pad holder of a disc brake, in particular for a commercial vehicle, wherein brake pads assigned to both sides of a brake disc are retained by a respective pad-holding spring in a spring-loaded manner in a pad shaft of a positionally fixed brake anchor plate or of a brake caliper. A pad-holding clip, which extends in the axial direction of the brake disc and is fastened to the brake caliper, is supported on the brake pads. The pad-holding clip has at least one limb extending approximately radially in relation to the brake disc and projecting into a recess of at least one brake pad. It is further achieved with a brake pad of a disc brake, in particular for a commercial vehicle, with a lining carrier plate, a friction lining fastened thereon, and a pad-holding spring connected to the lining carrier plate. At least one of the pad-holding spring, the lining carrier plate and the friction lining have a common recess disposed transversely to their longitudinal extent.

A brake pad holder configured in this manner increases the operating safety of the overall disc brake, since only brake pads intended for a particular brake model can now be used. In this respect, the inventive configuration of the brake pad holder constitutes a coding. Brake pads which do not have a recess into which the new pad-holding clip can be inserted cannot be installed, since the pad-holding clip cannot then be fitted. The fact that brake pads are components relevant to safety, which must also be correctly installed, imparts special importance to the invention and the effect achievable thereby.

The same applies to the relative movement between the pad-holding clip and the pad-holding spring in the circumferential direction of the brake disc now occurring in operation, that is during braking, since the brake pad is held in a practically form-fitting manner by the engagement of the pad-holding clip.

The special stress on the components, that is, the pad-holding spring and the pad-holding clip, caused hitherto by the relative movement no longer arises, resulting in a very noteworthy increase in the service life of these components; one factor among others contributing to this increase is the fact that surface coatings of these components are not worn away, which components are therefore exposed to no further risk of corrosion.

According to an advantageous development of the invention it is provided that an angled limb of the pad-holding clip, which engages in the recess of the brake pad adapted thereto, is provided only in the lining carrier plate. However, in principle it is also possible to configure the limb in such a manner that it also engages in a recess of the friction lining material.

A further aspect of the invention provides that the limb of the lining-holding clip, which limb is angled generally radially in relation to the axis of rotation of the brake disc, is provided with a scaling, for example in the form of scale marks by which wear of the brake pad or of its friction lining can be easily detected. Of course, this also contributes to an increase in the operating safety.

In this connection it should be emphasized that this control possibility can be achieved practically without any special complexity and cost regarding the design and manufacture, and that wear detection can be carried out easily. For this purpose, viewing through the assembly opening of the brake caliper is sufficient, through which both the brake pads and the pad-holding clip which bridges the assembly opening can be easily seen.

In relation to the longitudinal axis of the pad-holding clip, limbs arranged offset to one another may be provided on both sides thereof, one limb engaging in the brake pad arranged on the brake-application side of the disc and the other limb, arranged on the opposite longitudinal side, engaging in the reaction-side brake pad. This is especially advantageous if the brake pads are identical.

In principle, it is also possible to arrange the two limbs, each associated with a respective brake pad, on one longitudinal side of the pad-holding clip or at the center thereof. In all cases, in addition to the brake pad, the associated pad-holding spring should also be shaped correspondingly, such that it projects into the recess of the brake pad.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
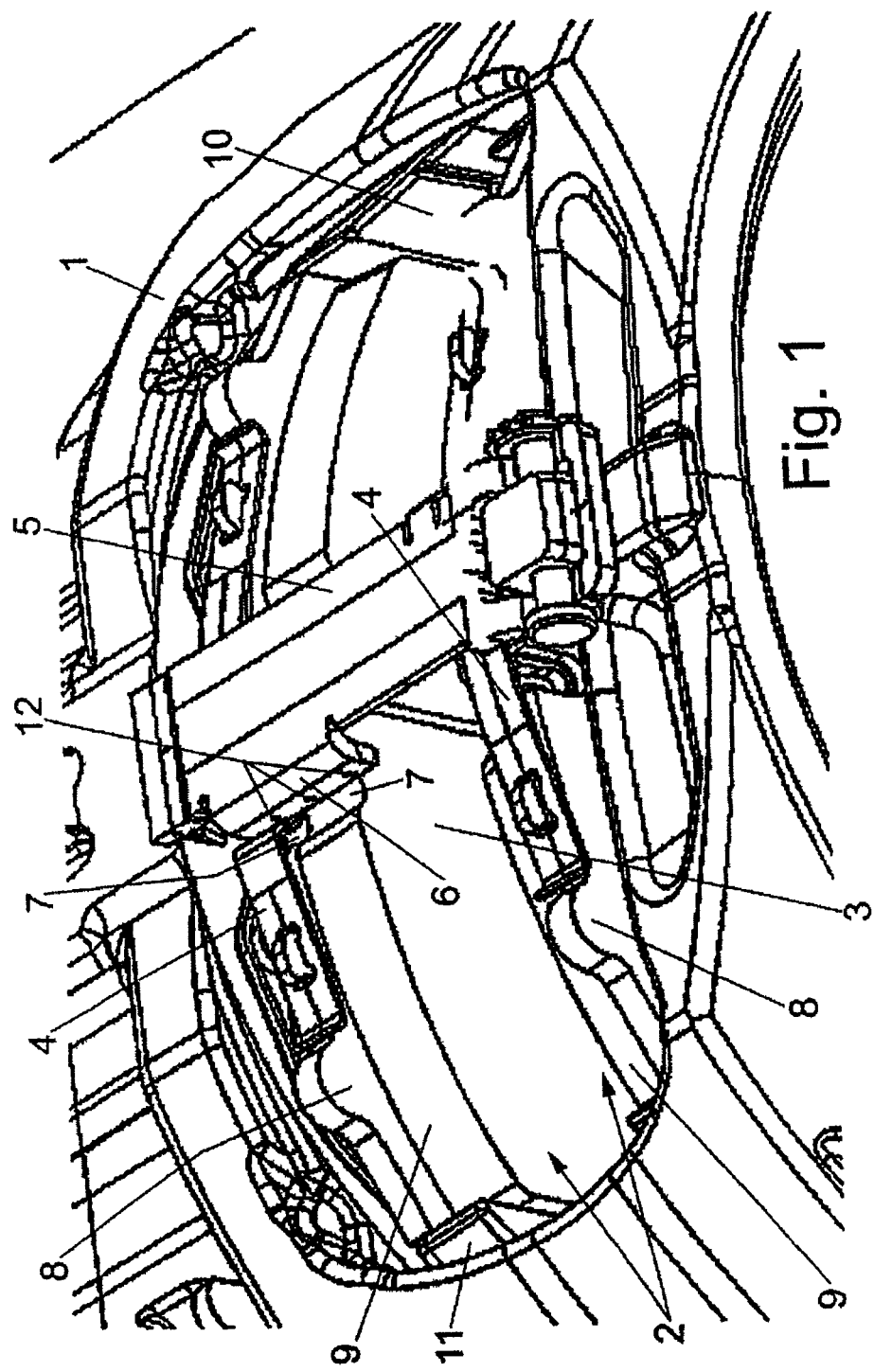
FIG. 1 shows a brake pad holder according to the invention in a perspective view.
Figure 2:
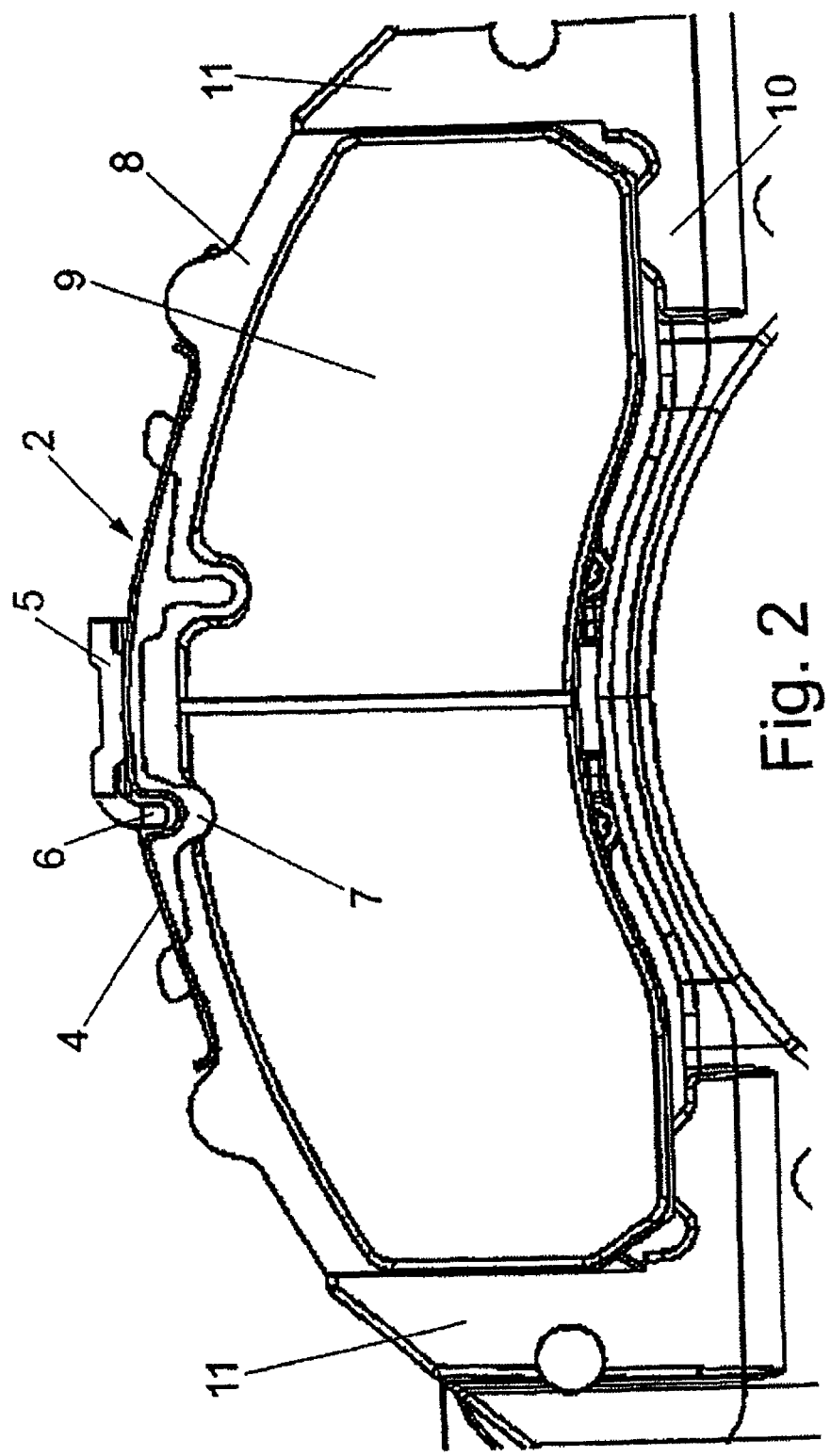
FIG. 2 shows the brake pad holder in a side view.

FIG. 1 shows a partial detail of a disc brake for a commercial vehicle with a brake caliper 1 in which two brake pads 2 are mounted, one on each side of a brake disc (not shown). These brake pads 2 are located in a pad shaft of a positionally fixed brake anchor plate or carrier 10 (FIG. 2) and are supported laterally by brake anchor plate horns 11. Each brake pad 2 consists of a lining carrier plate 8 and a friction lining 9 which is fastened thereto and which contacts the brake disc during braking.

The brake pads 2 are each retained under spring loading in the brake anchor plate 10 by a pad-holding spring 4, a pad-holding clip 5 being supported on the pad-holding springs 4. The pad-holding clip 5 bridges an assembly opening 3 transversely to the longitudinal extent of the brake pads 2 and is fastened at both ends to the brake caliper 1.

According to an exemplary embodiment of the invention, the pad-holding clip 5 has at least one limb 6 extending approximately radially in relation to the brake disc and projecting into a recess 7 of the brake pad.

In the present exemplary embodiment, the visible limb 6 is formed integrally in an angled manner with respect to the rest of the pad-holding clip 5, the latter being in the form of a stamping, so that very low-cost manufacture is possible.

The recess 7 of the brake pad is also provided in the lining carrier plate 8, in the friction lining 9, and in the associated pad-holding spring 4, and is dimensioned such that the brake pad 2 is retained in an approximately form-fitting manner transversely to the longitudinal extent of the pad-holding clip 5.

In FIG. 1, the brake pad 2 on the brake-application side can be seen to be provided with the recess 7 in which the limb 6 engages, which limb 6 is provided, on its side visible from the outside, with marks 12 forming a scale. When viewed in conjunction with the brake pad 2, the wear of the friction lining 9, or the attainment of a critical limit, can be read off by use of this scale.

TABLE OF REFERENCES NUMERALS

1 Brake caliper
2 Brake pad
3 Assembly opening
4 Pad-holding spring
5 Pad-holding clip
6 Limb
7 Recess
8 Lining carrier plate
9 Friction lining
10 Brake anchor plate
11 Brake anchor plate horn
12 Mark The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad holder of a disc brake having a caliper, comprising:
   brake pads, each brake pad being assigned to a respective side of a brake disc and having an associated pad-holding spring by which the brake pad is retained in a spring-loaded manner in a pad shaft of the disc brake;
   a pad-holding clip, having a substantially rectangular cross-section, operatively configured to extend in an axial direction of the brake disc and being fastenable to the brake caliper, the pad-holding clip being supported on the brake pads; and
   wherein the pad-holding clip has at least one limb extending away from the rectangular cross-section approximately radially in relation to the brake axis, the at least one radially extending limb projecting into a corresponding recess of at least one of the brake pads, the recess opening in an approximately radial direction in relation to the brake disc axis, and the recess is provided in at least two of the pad-holding spring, a lining carrier plate of the brake pad, and a friction lining material of the brake pad.

2. The brake pad holder according to claim 1, wherein the at least one limb is angled relative to a major plane of the pad-holding clip.

3. The brake pad holder according to claim 1, wherein the at least one limb is formed integrally with the pad-holding clip.

4. The brake pad holder according to claim 2, wherein the at least one limb is formed integrally with the pad-holding clip.

5. The brake pad holder according to claim 1, wherein two limbs are provided, one on each longitudinal side of the pad-holding clip.

6. The brake pad holder according to claim 4, wherein two limbs are provided, one on each longitudinal side of the pad-holding clip.

7. The brake pad holder according to claim 1, wherein a longitudinal extent of the limb corresponding to a longitudinal axis of the pad-holding clip extends over an entire thickness of an associated brake pad.

8. The brake pad holder according to claim 1, further comprising a scale operatively configured on the at least one limb, said scale being configured for detection of wear of the brake pad.

9. The brake pad holder according to claim 7, further comprising a scale operatively configured on the at least one limb, said scale being configured for detection of wear of the brake pad.

10. The brake pad holder according to claim 1, wherein the at least one limb engages in an approximately form-fitting manner in a recess in a circumferential direction of the brake disc.

11. The brake pad holder according to claim 1, wherein the brake pad holder is operatively configured to hold the brake pads of a commercial vehicle disc brake.

12. A brake pad of a disc brake for use with a pad-holding clip having a substantially rectangular cross-section and at least one limb extending away from the rectangular cross-section in a radial direction relative to a brake disc axis, comprising:
   a lining carrier plate;
   a friction lining material secured to one side of the lining carrier plate;

a pad-holding spring coupled to the lining carrier plate at a circumferential edge thereof; and wherein at least one of the pad-holding spring, the lining carrier plate, and the friction lining material have a recess opening in an approximately radial direction in relation to the brake disc axis, the recess having a length disposed transversely with respect to a longitudinal extent of the at least one of the pad-holding spring, the lining carrier plate, and the friction lining material, said recess being located at a predefined location on the brake pad corresponding to an installed location of the pad-holding clip such that the recess engages with the limb of the pad-holding clip of the disc brake, and the recess is in each of the pad-holding spring, the lining carrier plate, and the friction lining material.

* * * * *